April 6, 1971 TAKASHI TSUCHIDA ET AL 3,573,990

SEALED TYPE DRY CELL

Filed Jan. 12, 1970

INVENTORS
TAKASHI TSUCHIDA
KOHEI HIRUKAWA
YUKIO OKAJIMA
FUMIO IGUMA

BY Eliot S. Gerber

ATTORNEY

United States Patent Office

3,573,990
Patented Apr. 6, 1971

3,573,990
SEALED TYPE DRY CELL
Takashi Tsuchida, Kohei Hirukawa, Yukio Okajima, and Fumio Iguma, Shizuoka-ken, Japan, assignors to Fuji Denki Kagaku Kabushiki Kaisha, Tokyo, Japan
Filed Jan. 12, 1970, Ser. No. 2,054
Claims priority, application Japan, Jan. 23, 1969, 44/5,461
Int. Cl. H01m 21/06
U.S. Cl. 136—107                                 6 Claims

ABSTRACT OF THE DISCLOSURE

The structure of a battery dry cell includes a cup-shaped bottom member having an annular projection vertically projecting near its bottom circumference. The bottom member is fitted over a bottom surface of an anode zinc can. An annular gasket is fitted to the bottom member and a cavity in the gasket is fitted to the annular projection. A skirt portion of a plastic cylindrical jacket, which is bent along the gasket, is radially constricted against the gasket by means of a metal member.

---

The present invention relates to a sealed type battery dry cell and more particularly to a leakproof structure of a dry cell.

Some conventional dry cells utilize a plastic cylindrical jacket. A skirt portion of the jacket is constricted outside of the anode zinc can. Such cells may be roughly classified into two types. In the first type, an annular projection is integrally formed with the anode zinc can, at its bottom portion, an O-ring is fitted around the projection, and the skirt portion of the plastic cylindrical jacket is constricted against the O-ring by a ring-shaped metal member covered thereover. In the second type, the skirt portion of the plastic cylindrical jacket is caught between an outer wall of a cup-shaped metal terminal attached to the bottom surface of the anode zinc can, which surface may not have a projection, and an inner wall of a metal ring which is L-shaped in section. In both types of structure, it is somewhat difficult to maintain the sealing effect or constricting effect unchanged, since both sealing structures have been fundamentally formed by constricting the skirt portion of the plastic cylindrical jacket against the zinc can, which is gradually consumed during discharge and storage. Moreover, it has been required to use an excessive amount of zinc in the can because an annular projection integral with the zinc can is formed in the first type of structure and because the anode zinc can should have enough pressure-resisting strength in the second type of structure. In the second type, the length of the L-shaped metal ring to be fitted over the zinc must be relatively long. The disadvantageous conditions described above have made the cost of cells, which should be low in price, expensive.

It is the objective of the present invention to provide a sealed type dry cell having a leakproof constricting structure at the skirt portion of a plastic cylindrical jacket, in which the sealing is maintained in spite of the consumption of a zinc can.

It is a further objective of the present invention to provide a leakproof constricting structure as described above, wherein the sealing effect is remarkably improved at a relatively low cost.

In accordance with the invention, an annular projection is vertically formed integral with a cup-shaped metallic bottom member. The bottom member is in contact with the bottom surface of the anode zinc can, near its bottom circumference. An annular gasket having a cavity in conformity with the annular projection fits onto the annular projection from outside. A skirt portion of a plastic cylindrical jacket is bent inwardly along the peripheral surface of the gasket. An annular metal member fits over the skirt portion of the plastic cylindrical jacket from outside and constricts the skirt radially.

The sealing effect of the dry cell structure, according to the invention, is not dependent upon the elasticity of the anode zinc can. The sealing effect always depends on the repelling power of the annular projection which tends to restore to the original state. Accordingly, a reliable constricting and sealing effect is obtained and maintained unchanged for a long period. The annular projection may be relatively short and, therefore, can be manufactured of only a little material. The shape of the annular projection is variously alterable. Preferably, the shape of the projection is such that a root portion thereof is narrower than a head portion.

The annular gasket, unlike the conventional O-ring, allows the annular metal member to be completely insulated from the anode zinc can and the cup-shaped bottom member.

For a better understanding of the invention, as well as further objects and features thereof, reference is made to the accompanying drawings, wherein like figures are represented by like reference numerals.

Figure 3:
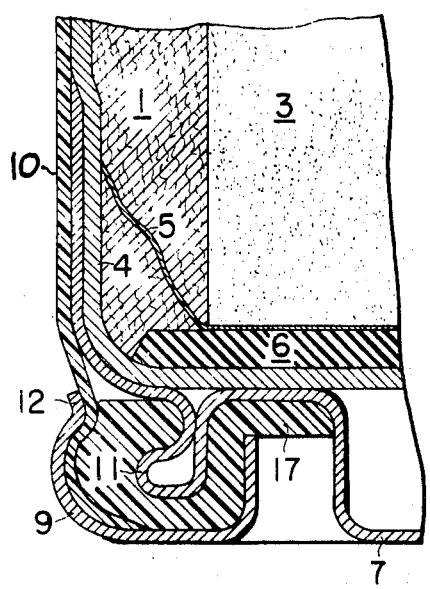
FIG. 3 is a partially enlarged sectional view of the leakproof structure of FIG. 1.
Figure 1:
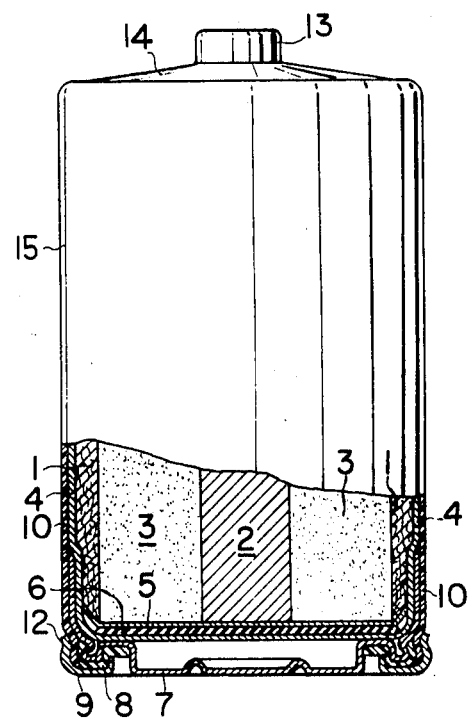
FIG. 1 is a partially exposed sectional view of a sealed type dry cell, showing an embodiment of the present invention.

An embodiment of a sealed type dry cell according to the invention will be described hereinafter. The dry cell basically comprises a bucket-shaped anode zinc can 4 containing cell elements. A plastic cylindrical jacket 10, including a top wall portion 14, seals an opening of the anode zinc can 4. Top wall portion 14 is opened at its center to expose a cathode terminal 13 which is electrically connected with the cell elements. A side wall portion 15 is integral with the top wall portion 14 and covers the side wall portion of the anode zinc can 4. A bottom member 7 is fitted over the bottom surface of the zinc can 4, said bottom member 7 having an annular projection 11 vertically projecting near the bottom circumference thereof. An annular elastic gasket 8, having a cavity 16, is provided so as to be fitted to the annular projection 11. An annular metal member 9 is utilized to constrict the plastic cylindrical jacket.

As shown in the drawings, the cell components include, within the anode zinc can 4 and inside of a paste layer 1, a cathode mixture 3 holding a carbon electrode 2 in the middle thereof. Reference numeral 5 indicates a paper for holding the cathode mixture 3 in a fixed position, and reference numeral 6 indicates a bottom spacer of paper.

The cup-shaped bottom member 7, having annular projection 11, has a root portion which is made narrower than the head portion and can be molded by pressing (stamping) a metal sheet. The cup-shaped bottom member 7 also serves as the anode terminal. Bottom member 7 is fitted over the bottom surface of the bucket-shaped anode zinc can 4, so that the side cylindrical surface of the bottom member 7 may be on the same exterior surface level as the zinc anode can 4. Thus the plastic cylindrical jacket 10, covering the bottom member 7 and the anode zinc can 4, has no shoulder at their abutting portions. The annular projection 11 engages with a cavity 16 of the insulating elastic gasket 8, preventing the gasket 8 from falling off during assembly.

The skirt of the plastic cylindrical jacket 10 is bent inwardly along the outer peripheral surface of the elastic gasket 8 and constricted from the outside by the metal member 9.

Figure 2:
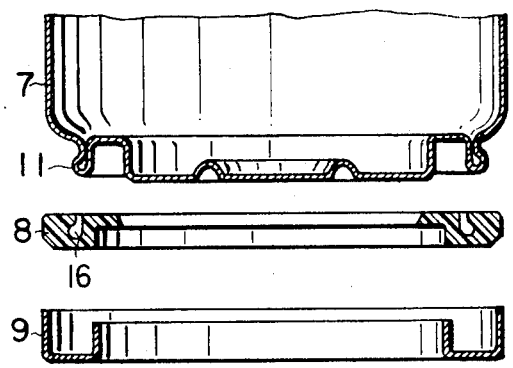
FIG. 2 is a sectional view of a bottom plate, an annular elastic gasket, and an annular metal member respectively, which constitute a leakproof structure of FIG. 1.

In the first embodiment shown in FIGS. 2 and 3, the metal member 9 is substantially U-shaped in cross-section and constricts the elastic gasket 8 radially by its opposing walls. The metal member 9 is depressed especially at 12. The metal member 9 is electrically insulated from the bottom member 7 by means of an inner annular tongue 17.

Figure 4:
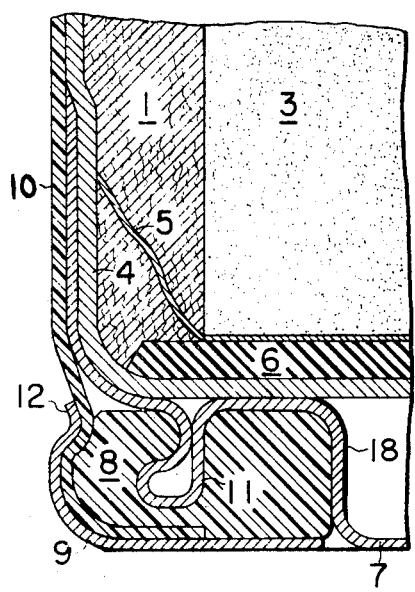
FIG. 4 is a partially enlarged sectional view showing a leakproof structure according to another embodiment of the invention.

In the second embodiment of the invention, illustrated in FIG. 4, the metal member 9 is substantially L-shaped in cross-section. According to this embodiment, a part of the bottom member 7 is substituted for one of the opposite walls of the U-shaped member in the first embodiment. The bottom member 7 has a vertical wall 18 opposite to a vertical wall of the annular projection 11, and the inner portion of the elastic gasket 8 is filled therebetween. The outer portion of the elastic gasket 8 is constricted radially by the L-shaped metal member 9.

In both embodiments, a highly excellent sealing effect is provided without depending on the anode zinc can 4, since the elasticities of the annular projection 11 and the annular elastic gasket 8 cooperate with each other to retain the seal.

We claim:

1. A sealed type dry cell comprising, in combination, a bucket-shaped anode zinc can containing cell components and having an opening formed at one edge thereof; a plastic cylindrical jacket comprising a top wall portion and a side wall portion integral with the top wall portion and covering a side wall portion of the anode zinc can; a cup-shaped metallic bottom member contacts the bottom surface of the zinc can and serves as the terminal, said bottom member having an annular projection vertically projecting near the bottom circumference thereof; an annular electrically insulative elastic gasket having a cavity fitted to the annular projection; and a metal member radially constricting a skirt portion of the plastic cylindrical jacket, said metal member being bent along and against the gasket.

2. A dry cell as claimed in claim 1, wherein the annular projection is narrower at the root portion thereof than at the head portion.

3. A dry cell as claimed in claim 1, wherein the metal member is U-shaped in cross-section and radially constricts the gasket fitted onto the said projection by opposite walls thereof.

4. A dry cell as claimed in claim 3, wherein the gasket has an annular tongue located between one edge of said U-shaped metal member and said annular bottom member.

5. A dry cell as claimed in claim 1, wherein the cup-shaped bottom plate has a vertical wall portion opposite to a vertical wall portion of the annular projection, a depressed portion between the vertical walls is filled with an inner portion of the elastic gasket, and an outer portion of said gasket is radially constricted from outside by a metal member which is L-shaped in cross-section.

6. A dry cell as claimed in claim 1, wherein in said plastic cylindrical jacket the top wall portion partly covers the opening in the zinc can and is opened at its center to expose a cathode terminal which is electrically connected with said cell components.

References Cited
UNITED STATES PATENTS

| | | | |
|---|---|---|---|
| 2,307,627 | 1/1943 | Lawson | 136—107.1 |
| 3,297,488 | 1/1967 | Balaguer | 136—107 |

WINSTON A. DOUGLAS, Primary Examiner

C. F. LE FEVOUR, Assistant Examiner

U.S. Cl. X.R.

136—133